(12) United States Patent
Pasternak et al.

(10) Patent No.: US 12,180,985 B2
(45) Date of Patent: Dec. 31, 2024

(54) FASTENER ASSEMBLY FOR DISPLAY CARDS, SIGNS AND THE LIKE

(71) Applicants: M Randall Pasternak, Thiensville, WI (US); Mark Donald Schaefer, Oconomowoc, WI (US)

(72) Inventors: M Randall Pasternak, Thiensville, WI (US); Mark Donald Schaefer, Oconomowoc, WI (US)

(73) Assignee: Randall Marketing International, Inc., Thiensville, WI (US)

( * ) Notice: Subject to any disclaimer, the term of this patent is extended or adjusted under 35 U.S.C. 154(b) by 336 days.

(21) Appl. No.: 17/569,756

(22) Filed: Jan. 6, 2022

(65) Prior Publication Data

US 2022/0213911 A1 Jul. 7, 2022

Related U.S. Application Data

(60) Provisional application No. 63/134,337, filed on Jan. 6, 2021.

(51) Int. Cl.
*F16B 5/10* (2006.01)
*F16B 12/22* (2006.01)
(Continued)

(52) U.S. Cl.
CPC ............... *F16B 12/22* (2013.01); *F16B 5/10* (2013.01); *F16B 12/44* (2013.01); *F16B 2012/106* (2013.01)

(58) Field of Classification Search
CPC .... A44B 99/005; F16B 5/0092; F16B 5/0621; F16B 2005/0671; F16B 5/0607;
(Continued)

(56) References Cited

U.S. PATENT DOCUMENTS 855,575 A * 6/1907 Henerlau ................. A44B 1/34
24/98
1,026,772 A * 5/1912 Ries ..................... A44B 99/005
24/DIG. 57

(Continued)

FOREIGN PATENT DOCUMENTS

JP 2000356948 12/2000
WO WO1989/010605 11/1989

*Primary Examiner* — Amber R Anderson
*Assistant Examiner* — Zachary A Hall
(74) *Attorney, Agent, or Firm* — RYAN KROMHOLZ & MANION, S.C.

(57) ABSTRACT

A device according to the present invention having a turnbuckle for manually locking and unlocking a display holder used to display information on vehicles and on structures. The turnbuckle is paired with a base. The combination of the turnbuckle and the base are removably coupled with the display holder where the turnbuckles are turned to lock the display holder in place. The combination of the turnbuckle and the base provide for increased frictional stability of the turnbuckle and the display holder. The display holder provides a sleeve or surface upon which information may be placed in or printed upon. The combination of the turnbuckle, the base and the display holder provides for a fixture. The turnbuckle may be paired with multiple embodiments of the base, support multiple embodiments of the display holder, and incorporated in multiple embodiments of the fixture. A method of pairing the turnbuckle with the base is provided as well.

21 Claims, 10 Drawing Sheets

(51) Int. Cl.
*F16B 12/44* (2006.01)
*F16B 12/10* (2006.01)

(58) Field of Classification Search
CPC .... F16B 5/10; F16B 5/06; F16B 21/02; Y10T
24/4578; Y10T 403/7005
USPC .......................................................... 403/348
See application file for complete search history.

(56) References Cited

U.S. PATENT DOCUMENTS

| | | | |
|---|---|---|---|
| 1,120,610 A * | 12/1914 | Force | F16B 5/10 |
| | | | 24/DIG. 57 |
| 2,397,889 A * | 4/1946 | Taylor | F16B 5/10 |
| | | | 411/554 |
| 2,728,259 A * | 12/1955 | Poupitch | F16B 5/06 |
| | | | 24/453 |
| 3,025,093 A | 3/1962 | Millrnan | |
| 3,202,038 A * | 8/1965 | Bass | F16B 5/06 |
| | | | 411/80.1 |
| 3,514,820 A | 6/1970 | Rogg | |
| 3,577,608 A * | 5/1971 | Texler | A44B 99/005 |
| | | | 24/625 |
| 3,665,629 A | 5/1972 | Shore | |
| 3,909,888 A | 10/1975 | Funston et al. | |
| 3,958,788 A | 5/1976 | Feibelman | |
| 4,089,116 A | 5/1978 | Bearinger | |
| 4,449,310 A | 5/1984 | Kline | |
| 4,498,827 A | 2/1985 | Mair | |
| 4,645,105 A | 2/1987 | Plumbridge | |
| 4,699,303 A | 10/1987 | Kline | |
| D295,919 S | 5/1988 | Makio | |
| 5,020,196 A | 6/1991 | Panach et al. | |
| 5,022,689 A | 6/1991 | Perdue et al. | |
| 5,134,757 A | 8/1992 | Johnson | |
| 5,184,375 A | 2/1993 | Hoyt | |
| 5,489,121 A | 2/1996 | Mohr | |
| 5,676,400 A | 10/1997 | Lin | |
| 5,697,176 A | 12/1997 | Kuni | |
| 5,996,264 A | 12/1999 | Nagel | |
| 6,003,259 A | 12/1999 | Krapf et al. | |
| 6,182,938 B1 | 2/2001 | Wright | |
| 6,336,765 B1 | 1/2002 | Watanabe | |
| 6,357,090 B1 * | 3/2002 | Murai | A45C 13/126 |
| | | | 24/593.1 |
| 6,484,429 B1 | 11/2002 | Przylucki | |
| 6,658,777 B2 | 12/2003 | Dundorf | |
| 6,678,977 B1 | 1/2004 | Sherman | |
| 6,688,027 B2 | 2/2004 | Fink | |
| 7,103,997 B2 | 9/2006 | Ruffino | |
| 7,121,030 B2 | 10/2006 | Schneider | |
| 7,159,347 B1 | 1/2007 | Ngan | |
| 7,207,129 B2 | 4/2007 | Buchanan et al. | |
| D554,561 S | 11/2007 | DiCarlo | |
| 7,293,382 B2 | 11/2007 | Polvere et al. | |
| 7,487,611 B2 | 2/2009 | Robb | |
| 7,743,541 B2 | 6/2010 | Suciu et al. | |
| 7,823,311 B2 | 11/2010 | Pitcher et al. | |
| 9,015,973 B2 * | 4/2015 | Pasternak | A63B 69/36 |
| | | | 40/373 |
| 9,155,362 B2 * | 10/2015 | Shimizu | F16B 21/08 |
| 9,200,660 B2 * | 12/2015 | Tisol, Jr. | F16B 21/02 |
| 10,176,732 B1 | 1/2019 | Hinkens | |
| 2002/0035798 A1 | 3/2002 | Gray | |
| 2004/0128895 A1 | 7/2004 | Trudel | |
| 2004/0163295 A1 | 8/2004 | Fontana | |
| 2007/0144048 A1 | 6/2007 | Kodde et al. | |
| 2012/0211534 A1 | 8/2012 | Hake | |

* cited by examiner

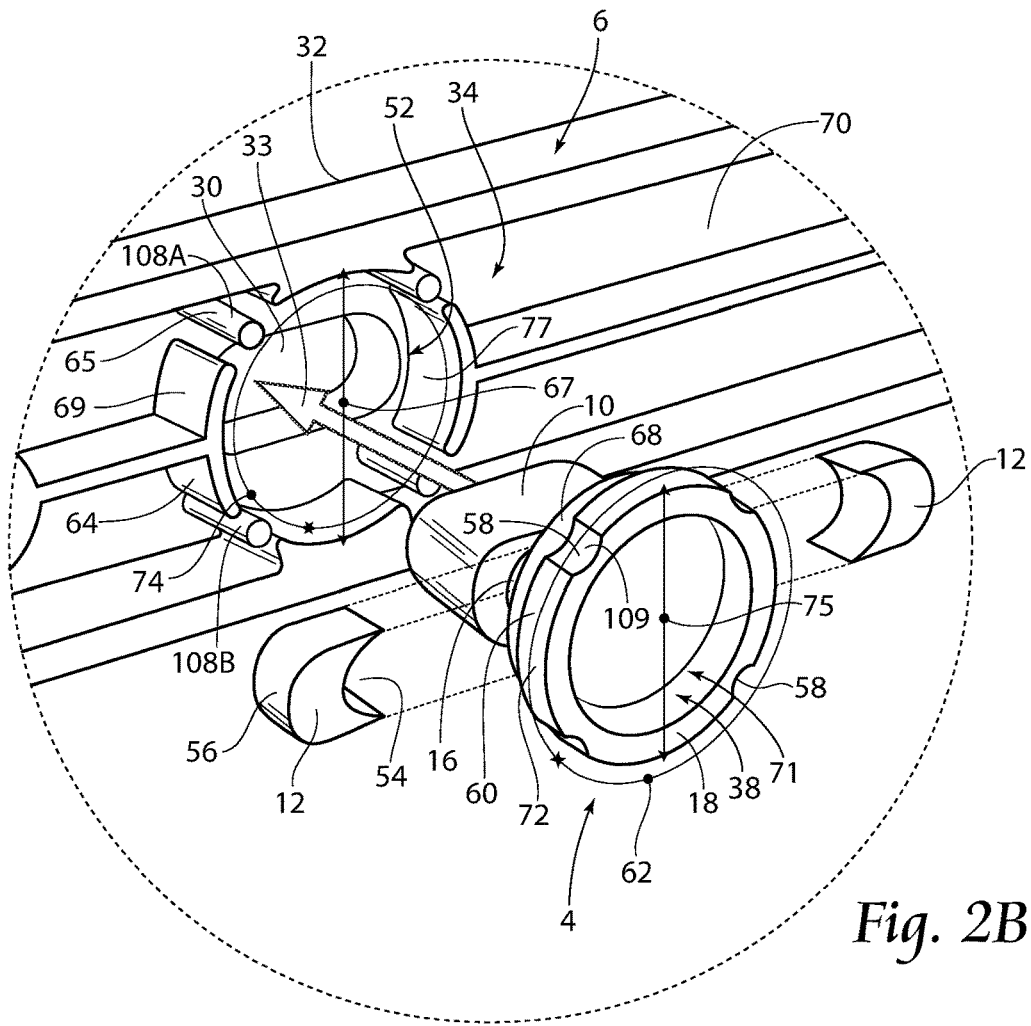

FASTENER ASSEMBLY FOR DISPLAY CARDS, SIGNS AND THE LIKE

RELATED APPLICATIONS

This application claims the benefit of U.S. provisional patent application Ser. No. 63/134,337, filed on 6 Jan. 2021.

BACKGROUND OF THE INVENTION

The present invention relates to an improved fastening device for removably holding a disposable card, signs and the like. Specifically, the present invention relates to turnbuckles for removably holding such items. Fastening devices such as those contemplated for use with the present invention are used in numerous settings, such as sporting events, informational display arrangements, and banner displays. In sporting events, the fastening devices may hold cards for ease of displaying, marking and storage of the display cards. Further, the fastening devices may allow for displaying information about the game played or the course on which the players are competing.

The fastening devices may be used in a store or other point of purchase location to display a card having indicia of the products or services being offered for sale. As another non-limiting example, the device may be used on a machine and include job or safety specifications. Due to the nature of the invention, the device may also find application in a setting where a first set of information is printed on one side of the card and a second set of information is printed on the opposite side of the card. The desired information may be displayed depending upon the orientation of the selected card surface relative to the invention. Finally, the fastening devices may be used to display banners.

In the prior art, fastening devices such as those described require the display surface to be fixed to the base or secured in a housing, which prevents ease of removal of the display surface. A fastening device in a novel turnbuckle design would allow for ease of interchangeable removal of display surfaces. Additionally, such prior art fastening devices have incorporated multiple separate units in connection in a hook and loop arrangement. This reduces the stability of the display surface allowing for damage to the display surface. A fastening device having a design with formfitting components would address such a deficiency. Further, fastening devices of the prior art have required complex mechanical arrangements to achieve the desired fastening characteristics. A fastening device made of a molded design would reduce the mechanical complexity and production costs therein. Finally where multiple components are used to build a fastening fixture in the prior art, inherent design flaws lead to the devices having unsecure interchanging parts. This instability results in the fastening fixtures disassembling at inopportune moments.

A need exists for a fastening device having a novel turnbuckle design.

A need exists for a fastening device having form fitting interchangeable turnbuckle components for reduced vibration of display surfaces.

A need exists for a fastening device having form fitting interchangeable turnbuckle components made of a mold design for reduction in costs.

A need exists for a fastening device having a bracket designed to reduce the transfer of vibration through the card holding assembly.

A need exists for a method to secure components of a fixture in order to ensure stable operation.

SUMMARY OF THE INVENTION

The present invention is directed to a novel solution for displaying information. Specifically, the invention provides for a novel turnbuckle allowing for user friendly, tool free, placement and removal of a display holder or display in a display or presentation setting. An intended benefit of the invention is to provide for a fastening device having a turnbuckle design.

The invention for the turnbuckle may be incorporated in or paired with a base. The combination of the turnbuckle and the base are combined with the display holder where the turnbuckles are turned to lock the display holder in place. Additionally, the combination of the turnbuckle and the base can be removed from contact with the display holder with a turn of the turnbuckles. The display holder provides a sleeve or surface upon which information may be placed in or printed. The combination of the turnbuckle, the base and the display holder provides for a fixture. The turnbuckle may be paired with multiple embodiments of the base, and incorporated in multiple embodiments of the fixture. It is observed the fixture, and the base, containing the turnbuckle, may be removably attached or affixed to a surface or a vehicle or structure.

A first embodiment of a display fixture may comprise a first embodiment of a base, paired with a first embodiment of the turnbuckle, in removable communication with a first embodiment of a display holder. Along a length of the base there may be at least two turnbuckle through-holes. The holes may extend from a base first side to a base second side. The holes may provide an aperture in which the turnbuckle is inserted. The turnbuckle may comprise a knob, an axle, and a cam fixed to one another. The knob may be positioned to form a first turnbuckle end. The cam may be positioned to form a second turnbuckle end. The axle may be positioned between the knob and the cam in a linear orientation from the first end to the second end. The knob, axle and cam may be in a unitary one piece construction. The turnbuckle may further comprise at least one but preferably two bearings. The bearings may be in removal communication with the knob, axle and cam.

The display holder may comprise at least one display holder through-hole. At least one display holder through-hole may be aligned with at least one turnbuckle through-hole when the display holder is removably positioned in contact with the base. The knob may be positioned through both the turnbuckle through-hole and the display holder through-hole to provide for removable mounting of the display holder onto the base.

At least one turnbuckle may be paired with the base by inserting the turnbuckle into a cam well on the base second side and advancing the turnbuckle knob through the turnbuckle through-hole, which is positioned in the cam well. The pairing between the cam of the turnbuckle and a wall perimeter of the cam well provides for a frictional fit between the cam and the wall perimeter. Specifically, the wall perimeter, which defines the cam well, comprises at least one cam well wall section and at least one detent spring interspaced, positioned along the wall perimeter, between respective cam well wall sections. The frictional relationship between the cam and the cam well wall sections provides for stability of the turnbuckle and the display holder in turn. Further, a cam wall of the cam contains indentations. The indentations communicate with the detent springs to provide for static stability of the turnbuckle, preventing the turnbuckle from moving laterally or dislodging from the base, and rotational stability of the turnbuckle. Rotational stability ensures that when the knob is turned to the locked position or the unlocked position, the turnbuckle remains in the desired locked or unlocked orientation when in use. An intended benefit of the invention is to provide for a fastening device having form fitting interchangeable turnbuckle components for reduced vibration of display surfaces. Additionally, an intended benefit of the invention is to provide for a fastening device having form fitting interchangeable turnbuckle components made of a mold design for a reduction in costs. Further, an intended benefit of the invention is to provide for a fastening device having a bracket designed to reduce the transfer of vibration through the card holding assembly.

A stability structure, comprising concentric rings and may be formed on, and protrude from, the base first side between turnbuckles to provide stability of the display holder when the display holder is removably attached to the turnbuckles and base pairing.

A method of inserting the turnbuckle into the base is described. An intended benefit of the invention is to provide for a method to secure components of a fixture in order to ensure stable operation without the need for additional components to secure each turnbuckle and prevent its removal or withdrawal from the base.

A second embodiment of the display fixture may comprise the base, paired with the turnbuckle, in communication with a second embodiment of the display holder. The second embodiment of the display holder may comprise a pull-tab.

A third embodiment of the display fixture may comprise a second embodiment of the base, paired with the turnbuckle of the invention, in communication with a third embodiment of the display holder. The base and display holder may be adjusted in size from the earlier embodiments.

A fourth embodiment of the display holder may be provided. The fourth embodiment of the display holder may comprise a pouch.

A third embodiment of the base may be provided, and paired with the turnbuckle of the invention. The third embodiment of the base may be at least substantially oval in shape, such that multiple bases may be used to hang or display a banner.

A fourth embodiment of the base may be provided, and paired with the turnbuckle of the invention. The fourth embodiment of the base may be at least substantially circular in shape thus having a disc shape. Multiple bases may be used to hang or display a banner in the manner previously described for positioning display holders against the embodiments of the base.

A fourth embodiment of the display fixture may comprise a fifth embodiment of the base, paired with a second embodiment of the turnbuckle of the invention, in communication with a fifth embodiment of the display holder. The second embodiment of the turnbuckle may have an axle length greater than that of the first embodiment of the turnbuckle. The fixture may comprise a front bracket removably positioned to layer the display holder between the front bracket and the base in order to position the display holder and reduce a vibration and a movement of the display holder. The extended axle length may provide for locking in place the display holder and front bracket. The display holder may comprise a display surface, which may be a polymer or fabric sheet, or a mesh. The display surface provides an area on which the displayed information may be posted or printed or drawn.

Further, a sixth embodiment of the display holder may be provided, which is a plate or at least a semi-rigid board, preferably made of a polymer, in which the information to be display is printed or written upon.

A bracket may be employed to mount the fixture onto a surface. The bracket may be in the form of an L-bracket or series of plates.

At least one an anti-vibration washer and an anti-vibration spacer may be employed in a layered fashion as part of the fixture. The anti-vibration washer and the anti-vibration spacer absorb the resonance vibrations of the structure or vehicle on which the fixture is attached to ensure a viewer may easily read the information displayed by the display holder. Specifically, the space and the washer are designed to reduce the shock induced on the fixture when vehicle 26 on which the fixture is mounted starts or stops motion. Additionally, the spacer and the washer are designed to reduce the shock induced on the fixture due to the vibrations produced by operation of the motor placed in the vehicle on which the fixture is mounted.

At least one of the third and the fourth embodiments of the base, or a combination thereof, may be paired with a crossbar to allow for hanging of pliable items or sheets, such as a curtain.

BRIEF DESCRIPTION OF THE DRAWINGS

FIG. 2B is a focused exploded rear view of the first embodiment of the base with a first embodiment of the turnbuckle.

FIG. 3 is a rear view of the first embodiment of the base, illustrating the first embodiment of the turnbuckle in communication with the base.

FIG. 4 is a perspective view of the first embodiment of the base paired with the first embodiment of the turnbuckle in an unlocked position.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is disclosed in the specification.

The present invention is directed to a novel solution for displaying information. Specifically, the invention provides for a novel turnbuckle (4, 4'), incorporated as part of a display fixture (2. 2', 2", 2'"), allowing for user friendly, tool free, attachment and removal of a display holder (8, 8, 8", 8''', 8'''') or display from the base (6, 6', 6", 6''', 6'''') of the display fixture (2. 2', 2", 2'") in a display setting. An intended benefit of the invention is to provide for a fastening device having a turnbuckle design.

Figure 1:
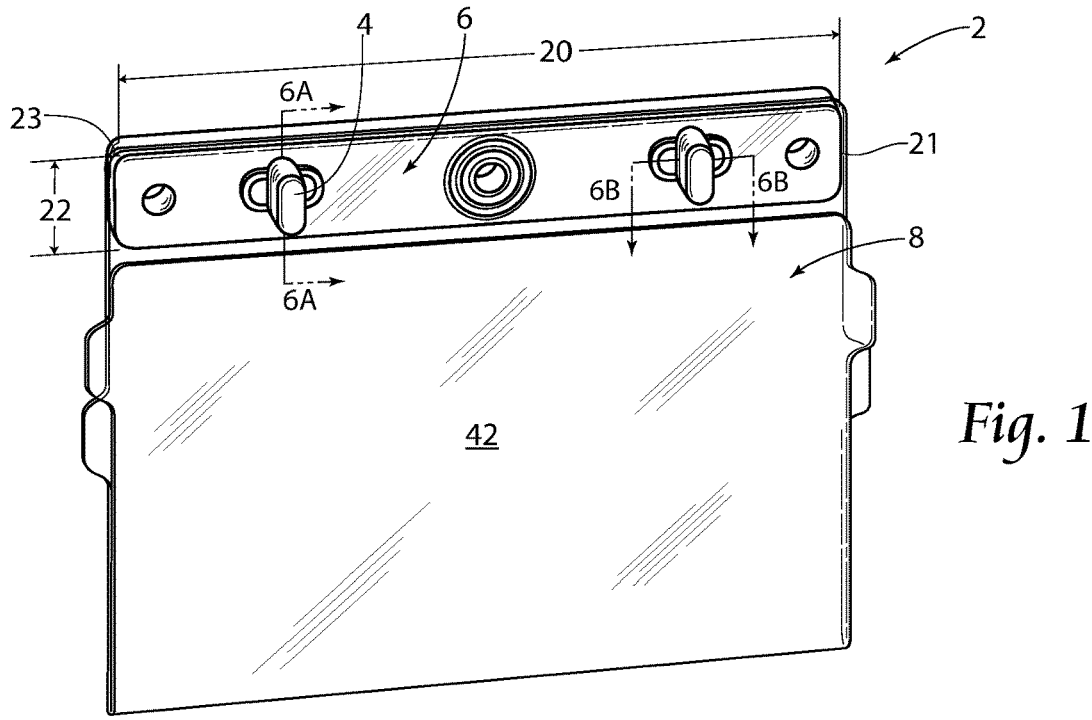
FIG. 1 is a perspective view of a first embodiment of the display fixture comprising a first embodiment of a base, paired with a first embodiment of the turnbuckle of the invention, in communication with a first embodiment of a display holder.
Figure 2A:
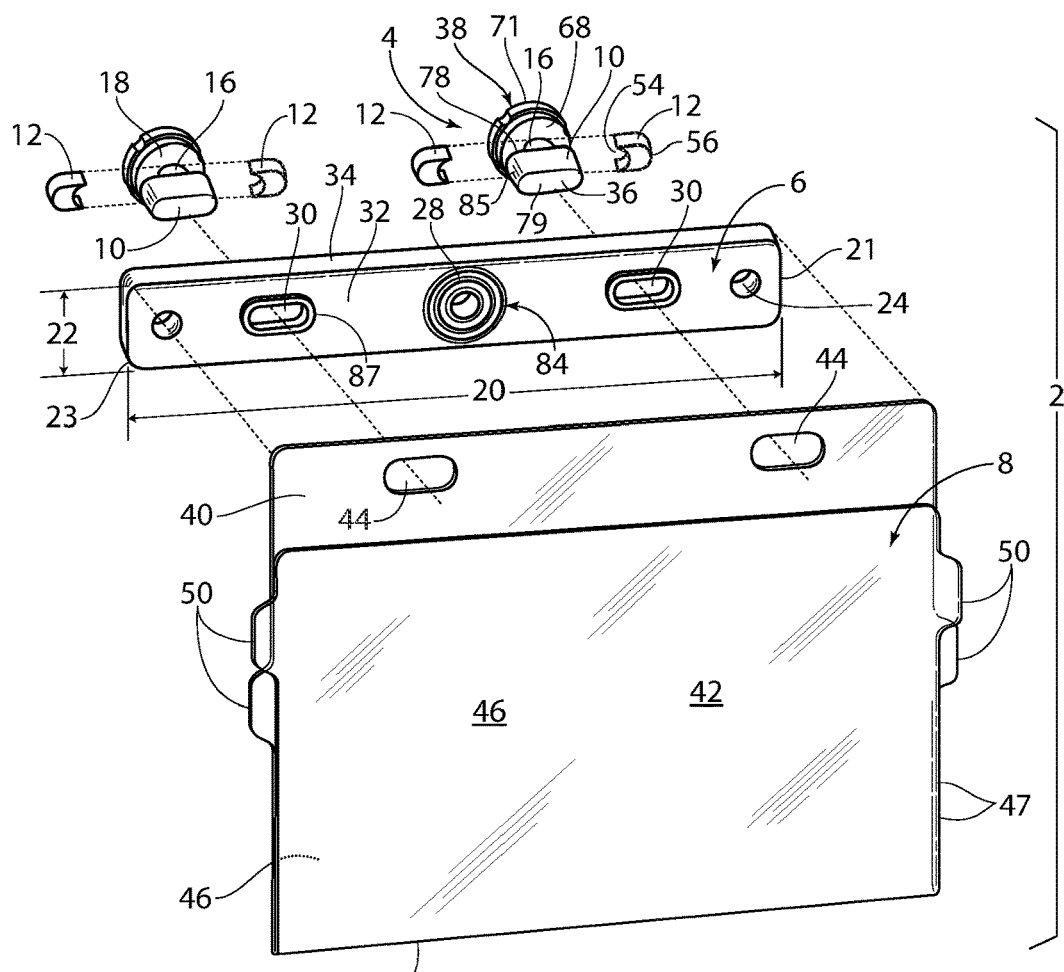
FIG. 2A is an exploded view of the first embodiment of the display fixture comprising the first embodiment of the base, paired with the first embodiment of the turnbuckle of the invention, in communication with the first embodiment of the display holder.

As illustrated in FIGS. 1, 2A and 2B, a first embodiment of a display fixture 2 is illustrated comprising a first embodiment of a base 6, paired with a first embodiment of the turnbuckle 4, in removable communication with a first embodiment of a display holder 8. The base 6 has a base length 20 and height 22. The length 20 is preferably greater than the height 22. Alternatively, the length 20 may be less than or equal to the height 22. The length 20 is defined by a base first end 21 and an opposite base send end 23, where the base first end 21 and the base second end 23 establish the dimension of the base 6 along the length 20. The base 6 is generally a rectangular structure. Alternatively, the base 6 may have any geometric shape. The base has at least one mounting through-hole 24 extending between a base first side 32 and a base second side 34, opposite the base first side 32, where the base first side 32 and the base second side 34 extend between the base first end 21 and the base second end 23. Preferably, the base 6 comprises a through-hole 24 in close proximity to the first end, and a through-hole 24 in close proximity to the second end 23, and a through-hole 24 at least substantially centrally located between the first end 21 and the second end 23. The mounting through-hole 24 provides for placement of the base 6 on a fixture or vehicle surface 26 (reference FIG. 7). Positioned centrally between opposite ends (21, 23) of the base 6 is positioned at least one stability structure 28 on the first side of the base. As will later be described, the stability structure 28 provides for stabilization of the display holder 8 when in communication with the base 6. A mounting through-hole 24 may be positioned with the stability structure 28 surrounding the through-hole 24 (reference FIG. 7). It is understood the base is preferably a molded polymer. Alternatively, the base 6 may be a forged metal. Alternatively, the base 6 may be a manufactured piece of at least one of polymer and metal components.

Along the length 20 are at least two turnbuckle through-holes 30. The holes 30 extend from the first side 32 to the second side 34. The holes 30 provide an aperture in which the turnbuckle 4 is inserted. The turnbuckle 4 comprises a knob 10, an axle 16 and a cam 18 fixed to one another. Knob 10 is positioned to form a first turnbuckle end 36. The cam 18 is positioned to form a second turnbuckle end 38. The axle 16 is positioned between the knob 10 and the cam 18 in a linear orientation from the first end 36 to the second end 38. The knob 10, axle 16, and cam 18 are in a unitary one-piece construction. The knob 10 has a shape which compliments the turnbuckle through-hole 30 such that the knob 10 fits into and through the turnbuckle through-hole 30. The turnbuckle 4 further comprises at least one but preferably two bearings 12. The bearings 12 are in removable communication with the knob 10, axle 16 and the cam 18. The bearings 12 shall be described further.

The display holder 8 comprises a mounting surface 40 and a display area 42 in molded communication. Alternatively, the display holder 8 is comprised of a woven mesh. The mounting surface 40 comprises at least one display holder through-hole 44. The display holder through-hole 44 is aligned with the turnbuckle through-hole 30 when the display holder 8 is removably positioned in contact with the base 6. The knob 10 is positioned through both the turnbuckle through-hole 30 and the display holder through-hole 44 to provide for removable mounting of the display holder 8 onto the base 6. The display area 42 of the first embodiment of the display holder 8 comprises two parallel panels 46. The panels are at least one of transparent material or translucent material. The panels 46 are connected opposite the mounting surface 40 along a folding edge 48. Each panel 46 may include one or two tabs 50 opposite one another along panel sides 47 of the respective parallel panel 46, where the panel sides 47 are orthogonal or nearly orthogonal to the folding edge 48. The tab/tabs 50 allow for separating the panels 46 of a display holder 8 to insert a pamphlet, card, flier or other form of information.

As illustrated in FIGS. 2A to 2B, the cam 18 of each turnbuckle 4 has a principally and at least substantially disc shape with a first cam side 68 and an opposite second cam side 71. The second cam side 71 is the turnbuckle second end 38. The first cam side 68 and the second cam side 71 are separated by a cam wall 72. As seen in FIG. 2B, a side of the cam wall 72 opposite the first cam side 68 may form the second cam side 71. The cam wall 72 comprises an outer cam wall surface 60 which defines the circumference 62, or nearly defines the circumference 62, of the cam 18. The outer cam wall surface 60 comprises at least one (1) and preferably four (4) concave indentations 58 positioned equidistance or nearly equidistance about the outer cam wall surface 60, circumference 62 of the cam 18. Where four (4) concave indentations 58 are employed, the indentations are at least substantially ninety (90) degrees from one another. Alternatively, the outer cam wall surface 60 may have up to ten (10) concave indentations 58.

As illustrated in FIG. 2B, the knob 10 is positioned into and through the turnbuckle through-hole 30 in a turnbuckle insertion direction 33 from the base second side 34 to, and preferably beyond, the base first side 32 to construct a completed base 6 and turnbuckle 4 combination. The base second side 34 comprises a cam well 52 about at least one turnbuckle through-hole 30. Preferably, each cam well 52 surrounds only one turnbuckle through-hole 30. Alternatively, a cam well 52 may surround more than one turnbuckle through-hole 30.

As illustrated in FIGS. 2A to 2B, a well perimeter 64 of the cam well 52 defines the perimeter of the cam well 52. The perimeter 64 comprises intermittent cam well wall sections 69 extending from the second side surface 70 at least partially defining the second side 34. The cam well wall sections 69 are arranged about the turnbuckle through-hole 30 such that inner wall section surfaces 77 define an inner well circumference 74, as well as define an inner diameter of the cam well 67. Between the cam well wall sections 69, and further defining the perimeter 64 of the cam well 52, is at least one detent snap 65 extending from the second side surface 70. It is understood the at least one detent snap 65 further defines the inner well circumference 74 and the inner diameter of the cam well 67.

Figure 6A:
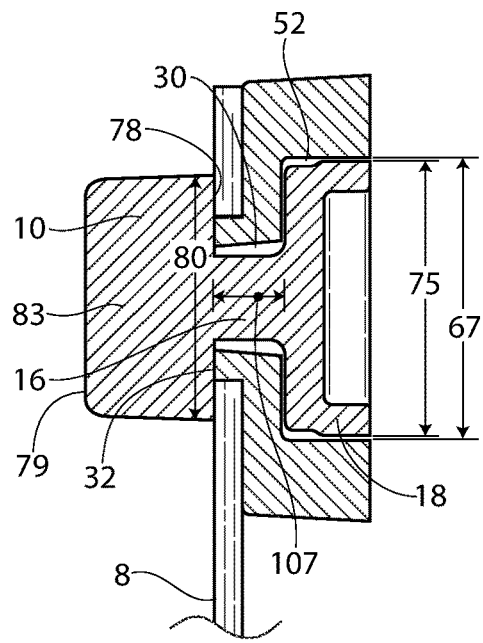
FIG. 6A is a side cross-sectional view, taken through line 6A-6A of FIG. 1, of the first embodiment of the base paired with the first embodiment of the turnbuckle of the invention in a locked position.
Figure 6B:
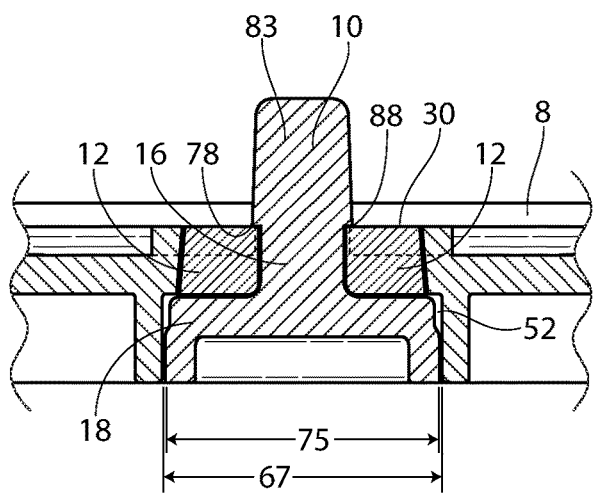
FIG. 6B is a top cross-sectional view, taken through line 6B-6B of FIG. 1, of the first embodiment of the base paired with the first embodiment of the turnbuckle in the locked position.

As illustrated in FIGS. 6A to 6B, the inner diameter of the cam well 67 is substantially equal to, or slightly larger than an outer diameter of the cam 75. As illustrated in FIGS. 2A, 2B and 3, the outer diameter of the cam 75 is defined by the outer cam wall surface 60, such that the well perimeter 64, including the cam well wall sections 69 and detent snaps 65, and the outer cam wall surface 60 are in a concentric relationship when the turnbuckle 4 is inserted in the base 6.

As illustrated in FIGS. 2A to 2B, the detent snaps 65 are positioned in alignment with the indentations 58 of the cam 18. As a result the communication of the outer cam wall surface 60 of the cam 18 with the inner wall section surface 77 of the cam well wall sections 69 provides an a frictional relationship to prevent unintended rotation of the turnbuckle 4. Additionally, the outer diameter of the cam 75 at the indentations 58 is smaller than the inner diameter of the cam well 67 at the respective detent snaps 65. As a result the relationship between the detent snaps 65 and the indentations 58 provides for a frictional stabilization of the turnbuckle 4, wherein the relationship is restrictive of unintended movement, which includes lateral and rotational movement, of the turnbuckle 4.

As illustrated in FIGS. 2B and 3, in a preferred embodiment four (4) detent snaps 65 are positioned to define the perimeter of the cam wall 52 as described, and thus providing the frictional support to the respective turnbuckle 4. It is understood as few a one (1) detent snap may be positioned to define the perimeter of the cam wall 52 as described, and thus providing the frictional support of the respective turnbuckle 4. Alternatively, as many as ten (10) detent snaps 65 may be positioned to define the perimeter of the cam wall 52 as described, and thus providing the frictional support to the respective turnbuckle 4. The number of detent snaps 65 defining a perimeter 52 depends upon the application of the base 6, and the positions of the detent snaps 65 and indentations 58.

An intended benefit of the invention is to provide for a fastening device having a form fitting interchangeable turnbuckle components for reduced vibration of display surfaces. Additionally, an intended benefit of the invention is to provide for a fastening device having a form fitting interchangeable turnbuckle components made of a mold design for reduction in costs. Further, an intended benefit of the invention is to provide for a fastening device having a bracket designed to reduce the transfer of vibration thru the card holding assembly.

The axle 16 extends from the cam first side 68 and contacts the knob 10 at a knob second end 78. The knob 10 from the knob second end 78 to a knob first end 79. The knob first end defines the turnbuckle first end 36. Between the second end 78 and the first end 79 a knob cylinder 85 provides for surfaces to manually turn the turnbuckle 4. The cylinder 85 is oversized to provide for ease of turning the knob 10 and turnbuckle 4.

As illustrated in FIGS. 2A to 2B, it is observed the bearings 12 have a crescent surface 54 and an opposite convex surface 56. The crescent surface 54 for each bearing 12 is positioned towards the axle 16 such that the bearings in a turnbuckle 4 are opposite one another. Additionally the bearings 12 are positioned between the knob 10 and the cam 18. The bearings 12 are tapered for ease of insertion. The bearings 12 are positioned in place when the turnbuckle 4 is paired with the base 6. The bearings 12 provide supporting to the axle 16 when the turnbuckle 4 is rotated.

Figure 7:
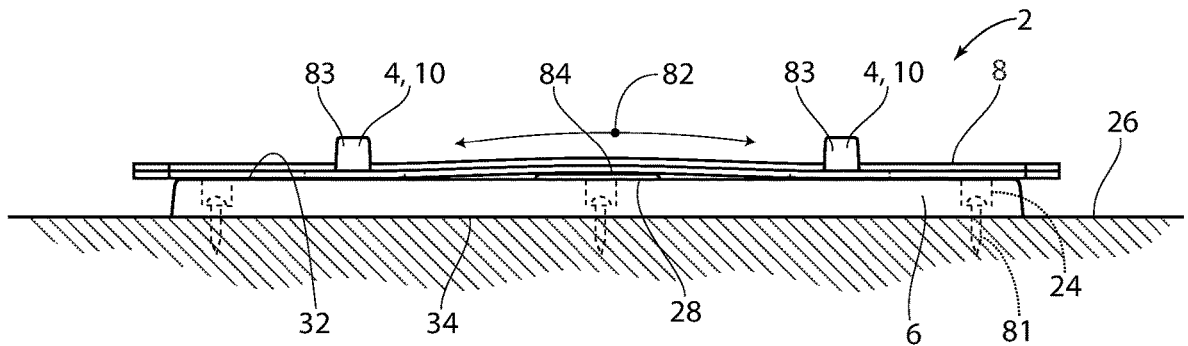
FIG. 7 is a top view of the first embodiment of the display fixture comprising the first embodiment of the base, paired with the first embodiment of the turnbuckle of the invention, illustrating the display fixture in communication with a surface.

With attention to FIGS. 2A, 2B, 3, and 4, the base 6 is illustrated as paired with the turnbuckle 4 of the invention in an unlocked position 86. When the turnbuckle 4 is advanced in the turnbuckle insertion direction 33 into the turnbuckle through-hole 30 (reference FIG. 2B), the knob width 80 is in alignment with the turnbuckle through-hole 30 to allow for the knob 10 to advance through the through-hole 30 to the base first side 32. As a result, the knob 10 rests in a final position with the knob second end 78 resting on the base first side 32. The turnbuckle through-hole 30 is defined by a lip 87 extending at least partially around the through-hole 30 on the base first side 32, reference FIGS. 2A and 4. The knob 10 comprises a knob second end edge 88, which is provided for with the interaction between the axle 16 and the knob second end 78, reference FIG. 6B. Upon insertion of the turnbuckle 4 knob 10 through the through-hole 30, the edge 88 rests upon the lip 87 in the unlocked position 86. The interaction between the edge 88 and the lip 87 prevents removal of the turnbuckle 4 from the base 6 while still allowing for rotation of the turnbuckle assembly to the locked position 83, reference FIG. 6B for the locked position 83. As illustrated in FIGS. 3 and 7, the insertion of the turnbuckle 4 from the base second side 34 to the base first side 32 provides additional stability that the turnbuckle 4 will not dislodge from the base 6, because the surface 26 is positioned against the cam 18 when the base 6 is mounted to the surface 26.

Figure 5:
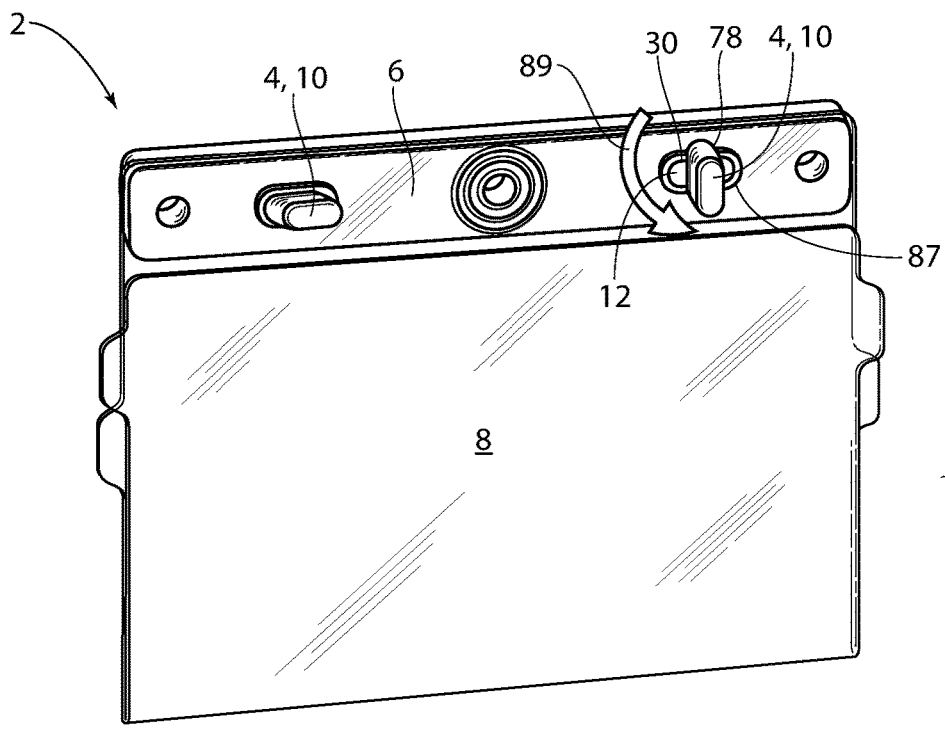
FIG. 5 is a perspective view of the first embodiment of the display fixture comprising the first embodiment of the base, paired with the first embodiment of the turnbuckle of the invention, in communication with the first embodiment of the display holder, illustrating rotation of one turnbuckle to a locked position.

With attention to FIG. 5, rotation of the turnbuckle 4 to a locked position 83 is illustrated. A user rotates 89 the knob 10 of the turnbuckle 4 to a position such that the knob 10 and turnbuckle through-hole 30 are not in alignment. Preferably, the user rotates the knob 10 ninety (90) or substantially ninety (90) degrees. The rotation of the knob 10 transfers through the axle 16 and to the cam 18, reference FIG. 2B. In doing so, the cam 18 progresses in the same rotation as the knob 10. Wherein a first concave indentation 109 of the cam 18 rotates 89 in the in the same direction the knob 10 is rotated 89, reference FIGS. 2B and 5. With the rotation 89, the indentation 109 removably disengages from a first detent snap 108A and travels to, and removably engages, a second detent snap 108B along the well perimeter 64, reference FIGS. 2B and 5. Progression of the indentation (58, 109) to successive detent snaps (65, 108A, 108B) occurs for any number of detent snaps (65, 108A, 108B) and indentations (58, 109).

With attention to FIGS. 6A and 6B, the base 6, paired with the turnbuckle 4 of the invention, is illustrated in the locked position 83. The cam 18 is seated within the well 52. The axle 16 extends into the turnbuckle through-hole 30. The knob first end 79 contacts the axle 16 at or in close proximity to the base first side 32, reference FIG. 4A. The knob 10 has a knob width 80 at least at the knob second end 78. Preferably the knob width 80 extends from the knob second end 78 to the knob first end 79. When the turnbuckle 4 is in the locked position 83, the knob 10 is positioned ninety (90) degrees or between zero and ninety degrees with respect to the turnbuckle through-hole 30. In doing so, the knob second end 78 is no longer in alignment with the turnbuckle through-hole 30. The knob is tapered from the second end 78 to the first end 79. The tapering allows for ease of entry of the first end into the through-hole 30. Further, the second end has a size greater than the through-hole 30, this size difference of the knob second end 78 and the turnbuckle through-hole 30 prevents the turnbuckle 4 from being removed and provides for locking the display holder 8 against the base 6. Further it can be observed, reference FIGS. 5 and 6B, the bearings 12 are seated in the turnbuckle through-hole 30 such that that when the turnbuckle 4 is in the locked position, the bearings 12 cover the turnbuckle through-hole 30. Further as can be seen in FIG. 5, the knob second end 78 rests upon the lip 87. Alternatively, the knob second end 78 rests partially on the lip 88.

With attention to FIG. 7, the base 6, paired with the turnbuckle 4 of the invention and the display holder 8, it is illustrated the display fixture 2 is in communication with a fixture or vehicle surface 26. The base 6 is mounted to the fixture or vehicle surface 26 using mounting hardware 81. The display holder 8 is mounted to and locked to the base 6 using the turnbuckles, as turned in the locked positioned 83. As a result, the display holder 8 is compressed against the base first side 32.

The stability structure 28, as previously introduced, is on the base first side 32. The stability structure 28 preferably comprises a set of two concentric rings 84 molded to the base 6, reference FIG. 2A. Alternatively, the stability structure 28 preferably may comprise less than or more than two concentric rings 84 molded to the base 6, reference FIG. 2A. Alternatively, the stability structure 28 may be any form of raised structure. The compression of the display holder 8 against the stability structure 28 provides for deformation 82 of the display holder 8 away from the base 6 at the stability structure location with respect to the display holder 8 and in close proximity to the display holder 8 location with respect to the stability structure 28. The deformation 82 provides for stabilization of the display holder 8 from vibration greater than a fixture lacking the stability structure 28.

Figure 8A:
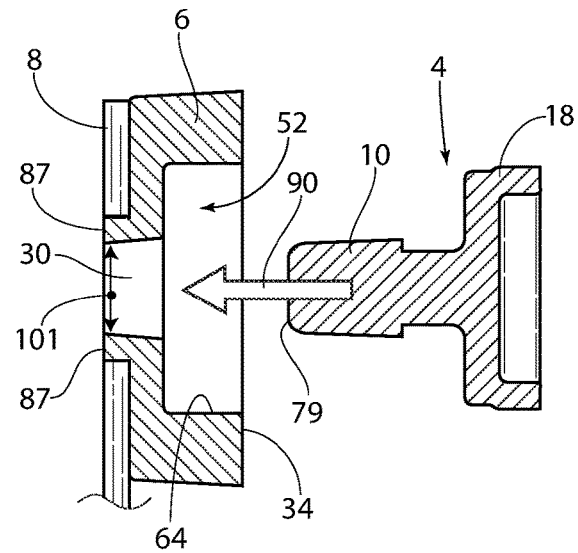
FIG. 8A is a side cross-sectional view, taken through line 8A, B, C of FIG. 4, of the first embodiment of the base and the first embodiment of the turnbuckle, illustrating a method of inserting the turnbuckle into the base comprising positioning of the turnbuckle prior to insertion.
Figure 8B:
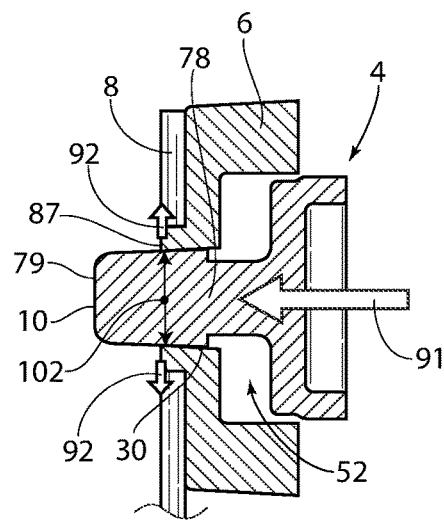
FIG. 8B is a side cross-sectional view of, taken through line 8A, B, C of FIG. 4, the first embodiment of the base and the first embodiment of the turnbuckle, illustrating a method of inserting the turnbuckle into the base comprising inserting the turnbuckle into a through-hole of the base.
Figure 8C:
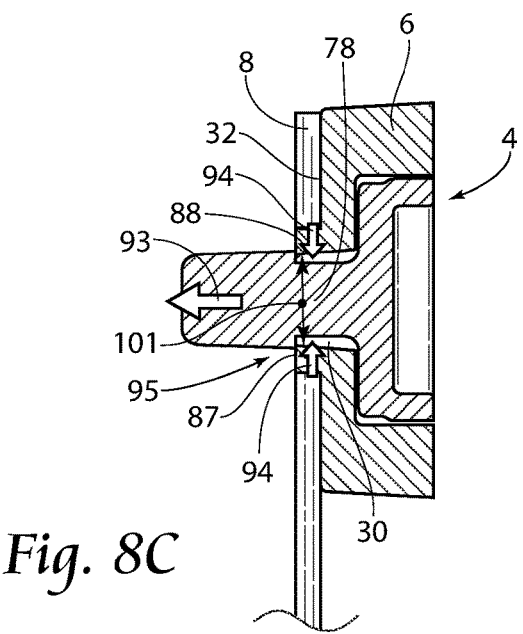
FIG. 8C is a side cross-sectional view, taken through line 8A, B, C of FIG. 4, of the first embodiment of the base and the turnbuckle, illustrating a method of inserting the turnbuckle into the base comprising positioning the turnbuckle in communication with a first side of the base such that the turnbuckle is prevented from removal.

With attention to FIGS. 8A, 8B an 8C, a method of inserting the turnbuckle 4 into the base 6 is described. As illustrated in Figure BA, the turnbuckle 4 is positioned with the knob 10, and specifically the knob first end 79, in the direction of the base second side 34, 90. In doing so, the knob 10 is aligned with the cam well 52. Specifically, the knob 10, and the knob width 80, reference FIG. 6A, is aligned with the turnbuckle through-hole 30 surrounded by the well perimeter 64 of the respective well 52. It is observed the turnbuckle through-hole 30 has a first diameter 101 at or in close proximity to the lip 87. As illustrated in FIG. 8B, the turnbuckle 4 is further positioned in the well 52 such that the knob 10 advances into the turnbuckle through-hole 30, 91. The turnbuckle 4 advancement provides for the knob first end 79 moving beyond the base first side 32. As stated earlier, the tapering of the knob 10 from the second end 78 to the first end 79 allows for the first end to easily pass into and beyond the through-hole 30. As noted earlier the size of the second end 78 is greater than the through-hole 30, this differentiation results in the knob 10, at or in close proximity to the second end 78, placing pressure on the lip 87 while the knob 10 advances through the turnbuckle through-hole 30, 92. The contact, and pressure, advances the lip 87 away from the knob 10 such that the turnbuckle through-hole 30 expands to a second diameter 102 at or in close proximity to the lip 87, 92. As illustrated in FIG. 8C, the turnbuckle 4 is further advanced, such that the knob 10 advances beyond the base first end 32, 93. After the knob 10 passes through the turnbuckle through-hole 30, pressure on the lip 87 from the knob 10 is removed and the turnbuckle through-hole 30 returns to a first diameter 101 at or in close proximity to the lip 87, 94. The knob second end 78, specifically the knob second end edge 88, rests on the base first end 78 and specifically the lip 87 surrounding the turnbuckle through-hole 30, 95. An intended benefit of the invention is to provide for a method to secure components of a fixture in order to ensure stable operation.

Figure 9:
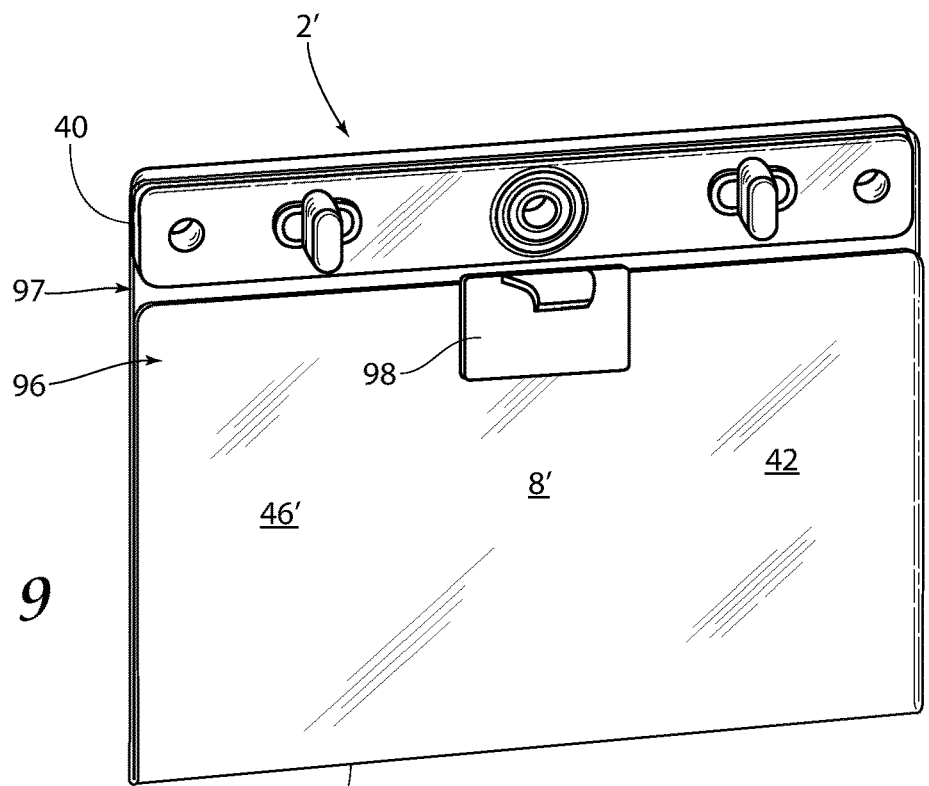
FIG. 9 is a perspective view of the second embodiment of the display fixture comprising the first embodiment of the base, paired with the first embodiment of the turnbuckle of the invention, in communication with a second embodiment of the display holder.

With attention to FIG. 9, a second embodiment display fixture 2' comprising the base 6, paired with the turnbuckle 4, in communication with a second embodiment of the display holder 8' is illustrated. The display fixture 2 may have at least one feature in common with the display fixture 2'. The display holder 8' may have at least one feature in common with the display holder 8. The display holder 8' comprises a mounting surface 40 and a display area 42. The display area 42 incorporates parallel panels 46' having at least one feature in common with the parallel panels 46. The parallel panels 46' comprise a first panel 96 and a second panel 97 connected at the folding edge 48, wherein the second panel extends into the mounting surface 40. The first panel 96 is positioned so that the panel 96 may be rotated away from the second panel 97 at the folding edge 48. Opposite the folding edge 48, the first panel 96 provides for a pull tab 98. The pull tab 98 provides the user a surface for separating the first panel 96 away from the second panel 97 to insert an informational page or card.

Figure 10:
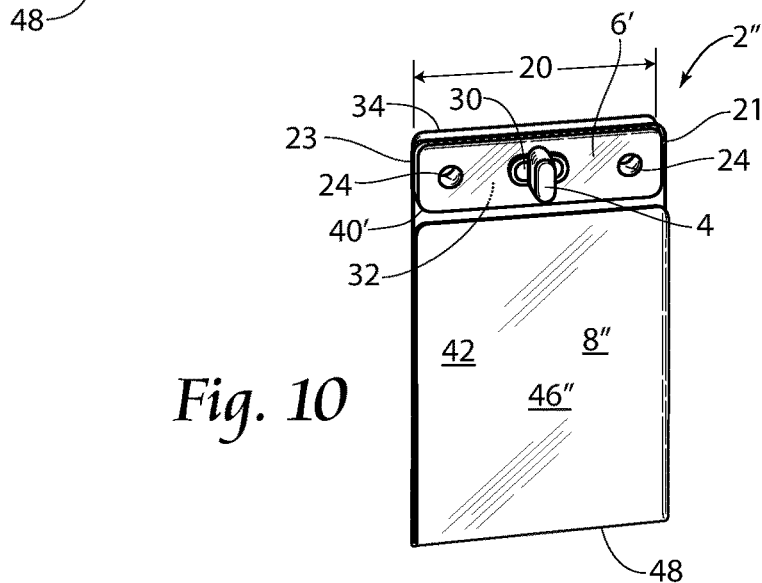
FIG. 10 is a perspective view of a third embodiment of the display fixture comprising a second embodiment of the base, paired with the first embodiment of the turnbuckle of the invention, in communication with a third embodiment of the display holder.

With attention to FIG. 10, a third embodiment of the display fixture 2" comprising a second embodiment of the base 6', paired with the turnbuckle 4 of the invention, in communication with a third embodiment of the display holder 8" is illustrated. The third embodiment of the display fixture 2" may share at least one feature with at least one of the first embodiment of the display fixture 2 and the second embodiment of the display fixture 2'. The second embodiment of the base 6' may share at least one feature with the base 6. The relationship between the base 6' and the turnbuckle 4 may share at least one feature of the relationship between the base 6 and the turnbuckle 4. The base 6' provides for one turnbuckle through-hole 30 over the length 20. Further at least one, preferably two mounting through-holes 24 surround the turnbuckle through-hole 30. One mounting through-hole 24 is in close proximity to the base first end 21, and the second mounting through-hole is in close proximity to base second end 23. The display holder 8" comprises second embodiment of the mounting surface 40' in molded communication with the display area 42. The mounting surface 40' provides for an opening to align with the turnbuckle through-hole 30 of the base 6'. The mounting surface 40' may share at least one feature with the mounting surface 40. The display area 42 contains two third embodiments of the parallel panels 46". The panels 46" are arranged with respect to the mounting surface 40' in the same manner as the parallel panels (46, 46') are arranged to the mounting surface 40. The parallel panels 46" are arranged with respect to one another in the same manner is the parallel panels (46, 46') are arranged to one another. This allows for the parallel panels 46" to be rotated away from one another to insert an informational page or card.

Figure 11:
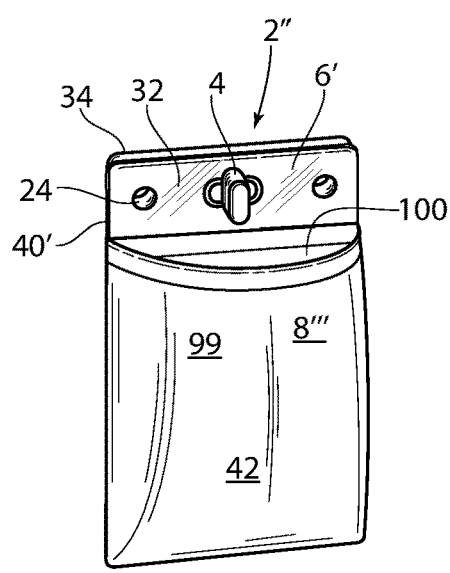
FIG. 11 is a perspective view of the third embodiment of the display fixture comprising the second embodiment of the base, paired with the first embodiment of the turnbuckle of the invention, in communication with a fourth embodiment of the display holder, a pouch.

With attention to FIG. 11, a third embodiment of the display fixture 2" comprising a second embodiment of the base 6', paired with the turnbuckle 4 of the invention, in communication with a fourth embodiment of the display holder 8'" is illustrated. The display holder 8'" may share at least one feature with at least one of the display holder 8, the second embodiment display holder 8' and the third embodiment of the display holder 8". The display area 42 of the display holder 8'" comprises a pouch 99. The pouch 99 has an open end 100 in close proximity to the base 6' when the display holder 8'" is mounted to the base 6'. Wherein an informational page, card or item make be placed in the open end 100 and into the pouch 99.

Figure 12A:
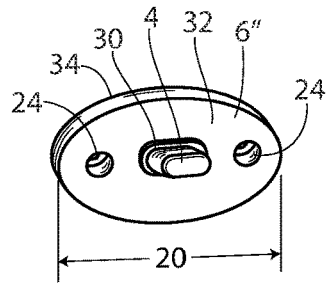
FIG. 12A is a front perspective view of a third embodiment of the base paired with the first embodiment of the turnbuckle of the invention.

With attention to FIG. 12A, a third embodiment of the base 6" paired with the turnbuckle 4 of the invention is illustrated. The third embodiment of the base 6" may share at least one feature with at least one of the base 6 and the second embodiment of the base 6'. The relationship between the base 6" and the turnbuckle 4 may share at least one feature of the relationship between at least one of the base 6 and the turnbuckle 4, and the base 6' and the turnbuckle 4. Each base 6" is at least substantially oval in dimension with a base first side 32 and a base second side 34. One base 6" may be used individually, or multiple bases 6" may be used, in conjunction with a display holder similar to at least one of the first embodiment of the display holder 8, the second embodiment of the display holder 8', the third embodiment of the display holder 8" and the fourth embodiment of the display holder 8'". The multiple bases 6" may be used to hang or display a banner.

Figure 12B:
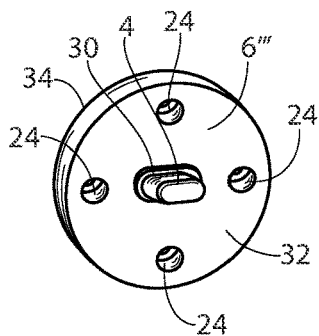
FIG. 12B is a front perspective view of a fourth embodiment of the base paired with the first embodiment of the turnbuckle of the invention.

With attention to FIG. 12B, a fourth embodiment of the base 6'" paired with the turnbuckle 4 of the invention is illustrated. The base 6'" may share at least one feature with at least one of the base 6, the second embodiment of the base 6', and the third embodiment of the base 6". The relationship between the base 6'" and the turnbuckle 4 may share at least one feature of the relationship between at least one of the base 6 and the turnbuckle 4, the base 6' and the turnbuckle 4, and the base 6" and the turnbuckle 4. Each base 6'" is at least substantially circular in dimension and having a disc shape with a base first side 32 and a base second side 34. The base 6'" comprises at least one, preferably four, through-holes 24 positioned about the turnbuckle through-hole 30, the turnbuckle 4, for attaching the base to a fixture or vehicle surface 26 (reference FIG. 7). One base 6'" may be used individually, or multiple bases 6'" may be used, in conjunction with a display holder similar to at least one of the first embodiment of the display holder 8, the second embodiment of the display holder 8', the third embodiment of the display holder 8" and the fourth embodiment of the display holder 8'". The multiple bases 6'" may be used to hang or display a banner in the manner described with the base (6, 6', 6").

Figure 12C:
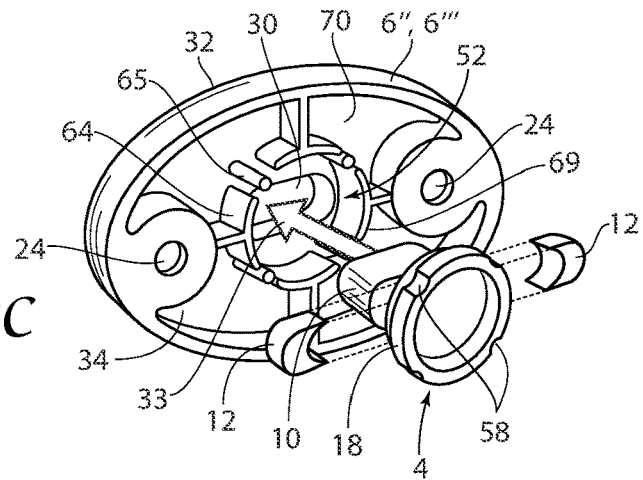
FIG. 12C is a rear exploded perspective view of the third embodiment of the base paired with the first embodiment of the turnbuckle of the invention.

With attention FIG. 12c, the relationship between the turnbuckle 4 and base (6", 6'") is illustrated. As previously explained the relationship between the turnbuckle 4 and the base (6", 6'") is identical to, or at least incorporates many of the features of, the relationship between the turnbuckle 4 and the base (6, 6'). FIG. 12C illustrates the relationship between the turnbuckle 4 and the base 6", but as stated this illustration of the relationship also applies to the relationship between the turnbuckle 4 and the base 6'".

Figure 13:
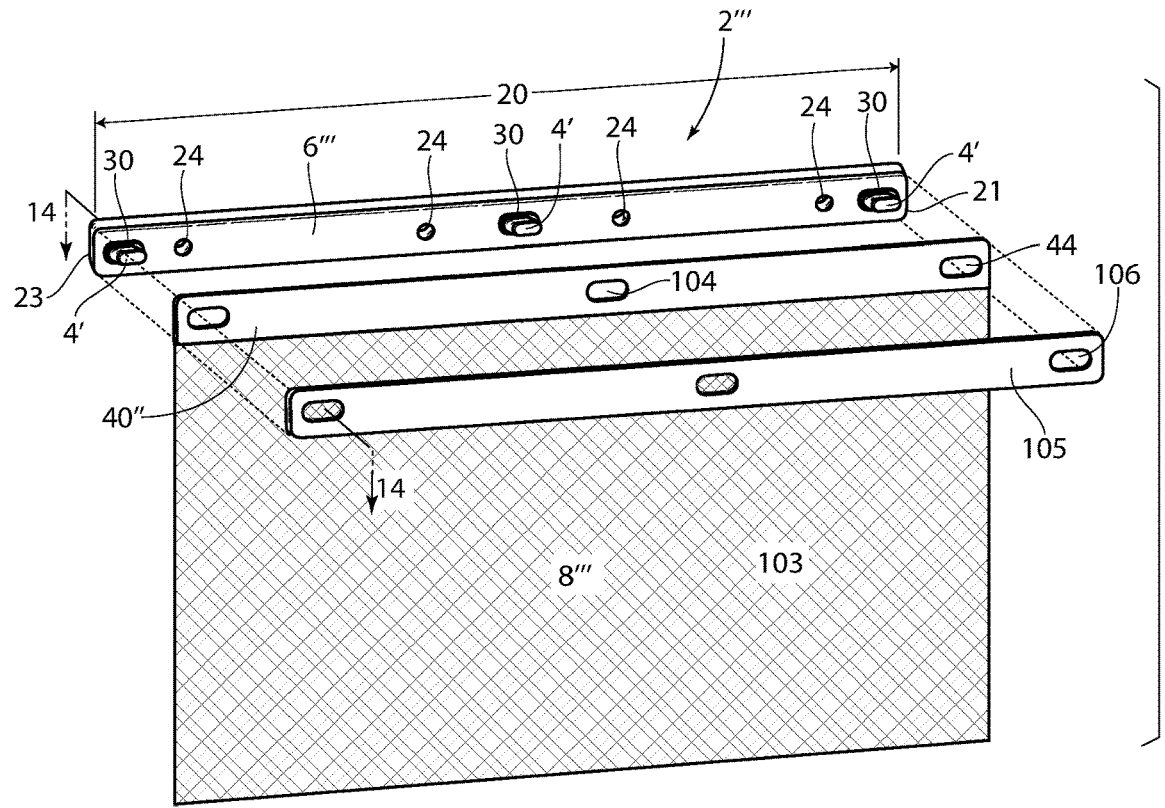
FIG. 13 is an exploded view of a fourth embodiment of the display fixture comprising a fifth embodiment of the base, paired with a first embodiment of the turnbuckle of the invention, in communication with a fifth embodiment of the display holder, a flexible web.

With attention to FIG. 13, a fourth embodiment of the display fixture 2'" comprising a fifth embodiment of the base 6"", paired with a second embodiment of the turnbuckle 4' of the invention, in communication with a fifth embodiment of the display holder 8"" is illustrated. The fourth embodiment of the display fixture 2'" may share at least one feature with at least one of the first embodiment of the display fixture 2, the second embodiment of the display fixture 2', and the third embodiment of the display fixture 2". The fifth embodiment of the base 6"" may share at least one feature with at least one of the base 6, the second embodiment of the base 6', the third embodiment of the base 6", and the fourth embodiment of the base 6'". The second embodiment of the turnbuckle 4' may share at least one feature with the turnbuckle 4. The fifth embodiment of the display holder 8"" may share at least one feature with the first embodiment of the display holder 8, the second embodiment of the display holder 8', the third embodiment of the display holder 8", and the fourth embodiment of the display holder 8'".

The base 6'''' has a length 20. At least one, preferably three, turnbuckles 4' are positioned along the length from the first base end 21 to the second base end 23. At least one, preferably four, mounting through-holes 24 are positioned along the length 20 from the first base end 21 to the second base end 23. Preferably, the through-holes 24 are positioned to provide for a secure fitting of the base 6'''' to a fixture or vehicle surface 26 (reference FIG. 7). The display holder 6'''' comprises a third embodiment of the mounting surface 40'' and a display surface 103. The display surface 103 may be a polymer or fabric sheet, or a mesh. The display surface 103 provides an area on which the displayed information may be posted or printed or drawn. The mounting surface 40'' may be a portion of the display surface 103 folded to a thickness and rigidity to support mounting of the remainder of the display surface 103. Alternatively, the mounting surface 40'' may be a sheet of polymer or metal attached to the display surface 103. The mounting surface 103 provides for through-holes 44 as previously described. Further, where necessary a portion of the unfolded display surface 103 may provide for through-holes 104 which align with the mounting surface through-holes 44 for hanging the display surface 103 when the mounting surface 40'' is a separate attached piece of polymer or metal. The display surface through-holes 104 share at least feature with the through-holes 44, and allow for insertion of the knob 10, similar to the through-hole 44. The display holder 8'''' interacts with the base 6'''' using the display holder through-holes 44, and display surface through-holes 104 where necessary, as previously disclosed with prior embodiments.

A front bracket 105 having a length of or close to length 20 is positioned against the mounting surface 40'' opposite the base 6'''' such that the mounting surface 40'' is layered between the base 6'''' and the front bracket 105. The front bracket 105 has front bracket through-holes 106. The front bracket through-holes 106 share at least one feature with the though hole 44, and allow for insertion of the knob 10, similar to the through-hole 44. The through-holes 106 align with the through-holes 44, through-holes 104 where necessary, and the turnbuckles 4' for mounting of the display holder 8''''. The front bracket 105 may be used in conjunction with a first embodiment of the base 6 and a second embodiment of the base 6''. The front bracket 105 may be used in conjunction with the turnbuckle 4.

Figure 14:
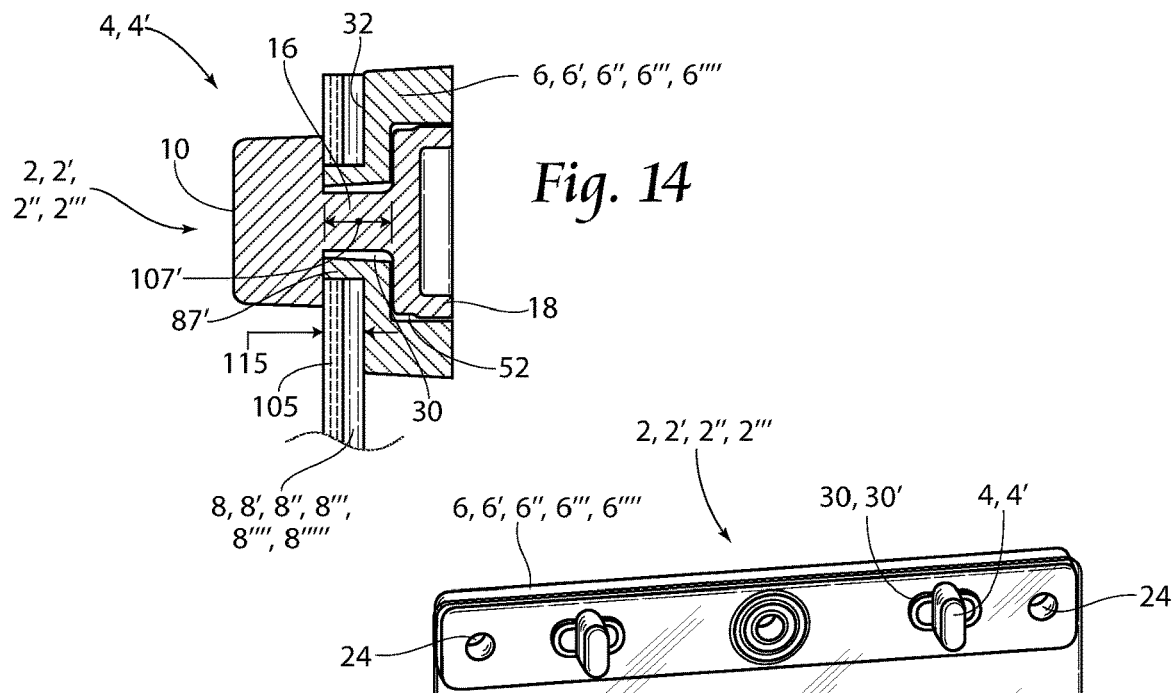
FIG. 14 is a side cross-sectional view, taken through line 14 of FIG. 13, of the display fixture comprising the fifth embodiment of the base, paired with a second embodiment of the turnbuckle of the invention, in communication with the fifth embodiment of the display holder.

With attention to FIG. 14, the fifth embodiment of the base 6'''', paired with a second embodiment of the turnbuckle 4' of the invention, in communication with the fifth embodiment of the display holder 8'''' is illustrated. Note the turnbuckle 4' may be paired with any combination of the fixture (2, 2', 2'', 2'''), the base (6, 6', 6'', 6''', 6''''), and the display holder (8, 8', 8'', 8''', 8'''', 8'''''). The base 6'''' comprises a second embodiment of the lip 87'. Wherein the second embodiment of the lip 87' shares at least one feature with the lip 87. The lip 87' defines a second embodiment of the turnbuckle through-hole 30'. Wherein the second embodiment of the turnbuckle through-hole 30' shares at least one feature with the through-hole 30. The turnbuckle 4' comprises the cam 18, knob 10 and an axle 16'. The axle 16' shares at least one feature with the axle 16. The knob, 10, axle 16' and cam 18 are arranged in the same manner and function in the same manner as the knob 10, axle 16 and cam 18 of the turnbuckle 4. The axle 16' has an extended axle length 107' from the cam 18 to the knob 10. The extended length 107' is greater than the axle length 107 (reference FIG. 2B) of the axle 16 of the turnbuckle 4, where the axle length 107 extends from the knob 10 to the cam 18. The second embodiment of the turnbuckle 4' is inserted into the base (6, 6', 6'', 6''', 6'''') in the same manner and method, previously described, as the turnbuckle 4 is inserted into the base (6, 6', 6'', 6''', 6''''). When inserted into the base (6, 6', 6'', 6''', 6''''), the extended length 107' provides for a separation distance 115 between the knob second end edge 88 and the base first side 32 which accommodates at least one of the display holder (8, 8', 8'', 8''', 8'''', 8''''') and the front bracket 105. It is observed the axle length 107 (reference FIG. 2B) provides a gap between the knob 10 and cam 18 to provide the same benefit of securing the display holder (8, 8', 8'', 8''', 8'''', 8''''').

Figure 15:
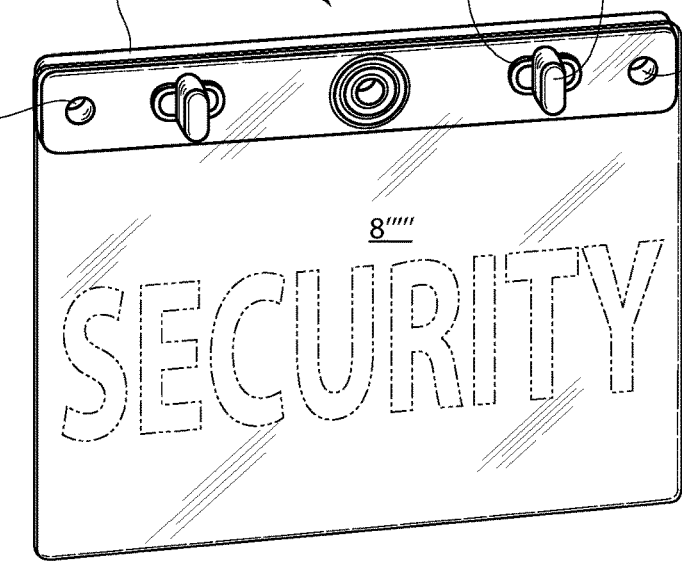
FIG. 15 is a perspective view of the fixture comprising the first embodiment of the base, paired the turnbuckle of the invention, in communication with a sixth embodiment of the display holder.

With attention to FIG. 15, the fixture 2 comprising the base 6, paired with the turnbuckle 4' of the invention, in communication with a sixth embodiment of the display holder 8''''' is illustrated. Note the display holder 8''''' may be paired with anyone of, and any combination of, the fixture (2, 2', 2'', 2'''), the base (6, 6', 6'', 6''', 6''''), and the turnbuckle (4, 4'). The sixth embodiment of the display holder 8''''' shares at least one feature with at least one of the first embodiment of the display holder 8, the second embodiment of the display holder 8', the third embodiment of the display holder 8'', the fourth embodiment of the display holder 8''', and the fifth embodiment of the display holder 8''''. The display holder 8''''' is a plate or at least semi-rigid board, preferably made of a polymer, in which the information to be display is printed or written upon.

Figure 16:
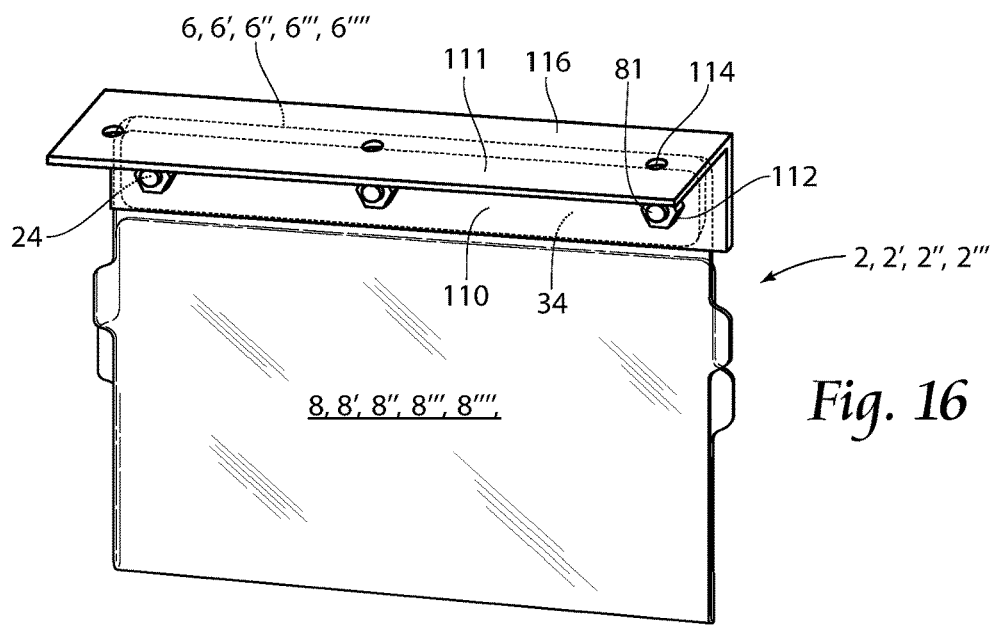
FIG. 16 is a rear perspective view of the first embodiment of the display fixture in communication with a first embodiment of a bracket.

With attention to FIG. 16, the display fixture (2, 2', 2'', 2''') is illustrated in communication with a first embodiment of a bracket 116. The bracket 116 is an L-bracket having a first plane 110 intersecting a second plane 111. The first plane 110 is removable attached to the second side 34 of the base (6, 6', 6'', 6''', 6''''), using though holes (not illustrated in the figures) in the plane 110 aligned with at least one through-hole 24 of the base (6, 6', 6'', 6''', 6''''), with the mounting hardware 81. A nut 112 may be threaded on the mounting hardware 81 to secure the base (6, 6', 6'', 6''', 6'''') to the bracket 116. The second plane 111 is at least one of affixed or removable attached to the fixture or vehicle surface 26 (reference FIG. 7). The surface may be a roof of a golf cart. Bracket mounting holes 114 provide for mounting the bracket 116, and the fixture (2, 2', 2'', 2''') to the fixture or vehicle surface 26. Alternatively, the bracket 116 may be affixed to the fixture or vehicle surface 26 (reference FIG. 7) through other means.

Figure 17:
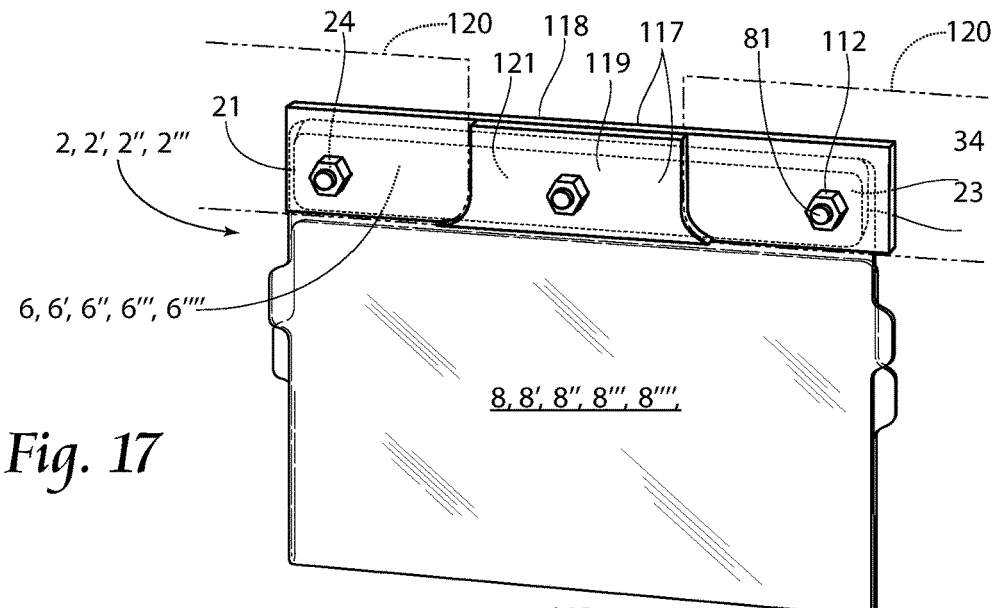
FIG. 17 is a rear perspective view of the first embodiment of the display fixture in communication with a second embodiment of a bracket.

With attention to FIG. 17, the display fixture (2, 2', 2'', 2''') is illustrated in communication with a second embodiment of a bracket 117. The bracket 117 comprises a first plate 118 and a second plate 119 removably positioned against the first plate 118 as described. The first plate is removably attached to the base (6, 6', 6'', 6''', 6'''') with the mounting hardware 81, which extends through flange through-holes 127 (not illustrated in the figures) in the plate 118 that are aligned with at least one through-hole 24 of the base (6, 6', 6'', 6''', 6''''). A nut 112 may be threaded on the mounting hardware 81 to secure the base (6, 6', 6'', 6''', 6'''') to the plate 118. At least one, preferably two flanges 120 contact the plate 118 on a side opposite the side of the plate the base (6, 6', 6'', 6''', 6'''') and the flange 120. The flange 120 extends from a cart or object on which the fixture (2, 2', 2'', 2''') is removably attached. Preferably two flanges extend, one towards the first end 21 and the second towards the second end 23 of the base (6, 6', 6'', 6''', 6''''). A space 121 may be present between the flanges 120 when the flanges 120 are attached to the plate 118. The second plate 119 in positioned between the flanges 120 and against the first plate 118 wherein the second plate 119 occupies the space 121. The second plate has at least one through-hole (not illustrated in the figures) which aligns with at least one combination of a through-hole of the first plate (not illustrated in the figures) and a through-hole 24. The respective mounting hardware 81 and nut are used to removably attach the second plate 119 so that the first plate 118 is layered between the base (6, 6', 6", 6"', 6"") and the second plate 119. The arrangement provides for another aspect of mounting the fixture (2, 2', 2", 2"'), base (6, 6', 6", 6"', 6"") and provides for a non-contoured, and planar, look of the mounting surfaces.

Figure 18:
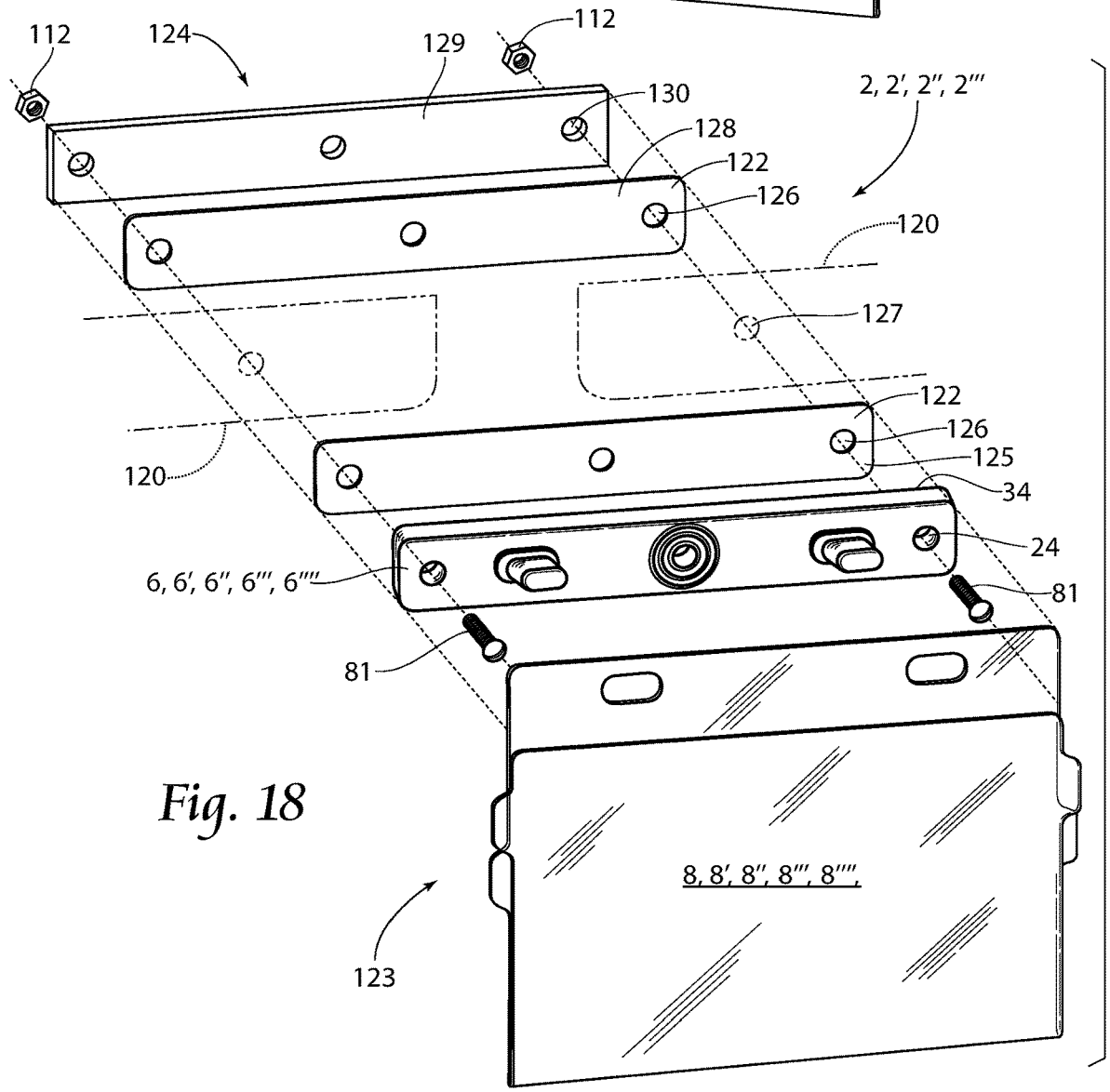
FIG. 18 is an exploded of the first embodiment of the display fixture, illustrating incorporation of at least one anti-vibration washer.

With attention to FIG. 18, the fixture (2, 2', 2", 2"') incorporating at least one anti-vibration washer 122 is illustrated. The anti-vibration washer 122 is a sheet, preferably made of a polymer, designed to absorb the resonance vibrations of the structure or vehicle on which the fixture (2, 2', 2", 2"') and base (6, 6', 6", 6"', 6"") are attached to ensure a viewer may easily read the information displayed by the display holder (8, 8', 8", 8"', 8"", 8""'). As seen from a viewing end 123 of the fixture (2, 2', 2", 2"') to a support end of the fixture 124, opposite the viewing end 123, the display holder (8, 8', 8", 8"', 8"", 8""') is attached to the base (6, 6', 6", 6"', 6"") as previously described. A first washer 125 is attached to the second side 34 of the base (6, 6', 6", 6"', 6""). The anti-vibration washer 125 contains at least one anti-vibration washer through-hole 126 which aligns with at least one through-hole 24. Opposite the base (6, 6', 6", 6"', 6"") the anti-vibration washer 125 removably contacts with at least one flange 120. At least one through-hole 126 aligns with a flange through-hole 127. Opposite the first anti-vibration washer 125, a second anti-vibration washer 128 removably contacts the flange 120. At least one flange through-hole 127 aligns with at least one through-hole 126 of the second anti-vibration washer 128. Opposite the second anti-vibration washer 128, a back plate 129 is removably attached to the second anti-vibration washer 128. At least one back plate through-hole 130 of the back plate 129 aligns with at least one through-hole 126 of the second anti-vibration washer 128. The back plate 129 maybe be comprised of at least one of a metal and a polymer. Thus, the display holder (8, 8', 8", 8"', 8"", 8""'), the base (6, 6', 6", 6"', 6""), the first anti-vibration washer 125, the flange 120, the second anti-vibration washer 128, and the back plate 129 are in a layered arrangement. At least one respective through-hole (24, 126, 127, 130) for each respective layer is in alignment and provides for mounting hardware 81 to be employed with a nut 112 to mount the all the respective layers to a fixture or vehicle surface 26 (reference FIG. 7) of a vehicle or structure.

Figure 19:
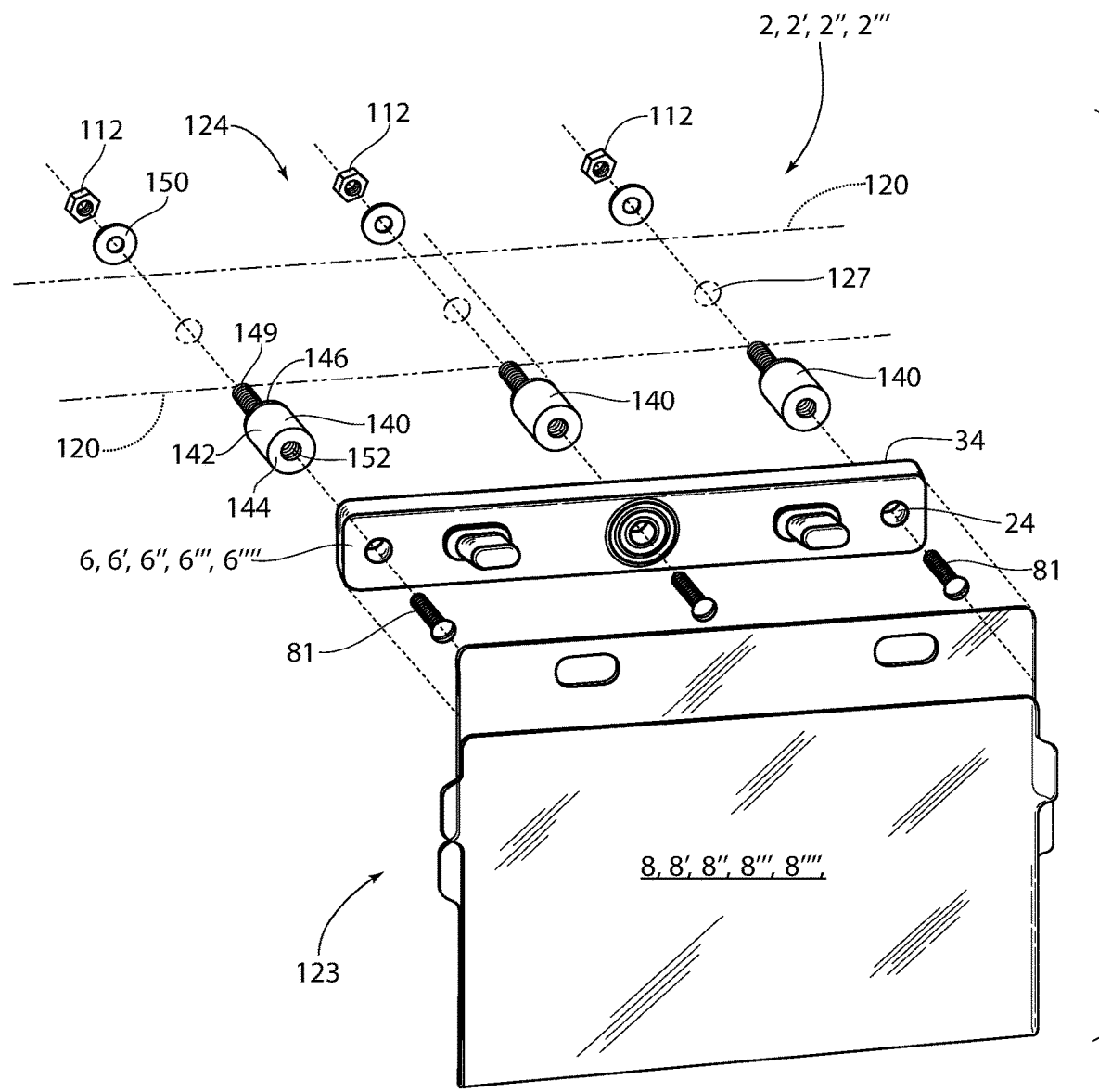
FIG. 19 is an exploded of the first embodiment of the display fixture, illustrating incorporation of at least one anti-vibration spacer.

With attention to FIG. 19, the display fixture (2, 2', 2", 2"') incorporating at least one anti-vibration spacer 140 is illustrated. The anti-vibration spacer 140 is preferably an elastomeric mount, designed to absorb the resonance vibrations of the structure or vehicle 26 (reference FIG. 7) on which the fixture (2, 2', 2", 2"') is attached to ensure a viewer may easily read the information displayed by the display holder (8, 8', 8", 8"', 8"", 8""'). Specifically, the spacer 129, and washer 122 (reference FIG. 18) as well, is designed to reduce the shock induced on the fixture (2, 2', 2", 2"') when vehicle 26 (reference FIG. 7) on which the fixture (2, 2', 2", 2"') is mounted starts or stops motion. Additionally, the spacer 129, and washer 122 (reference FIG. 18) as well, is designed to reduce the shock induced on the fixture (2, 2', 2", 2"') due to the vibrations produced by operation of the motor placed in the vehicle 26 (reference FIG. 7) on which the fixture (2, 2', 2", 2"') is mounted. As seen from a viewing end 123 of the fixture (2, 2', 2", 2"') to a support end of the fixture 124, opposite the viewing end 123, the display holder (8, 8', 8", 8"', 8"", 8""') is attached to the base (6, 6', 6", 6"', 6"") as previously described. A spacer 140 is removably attached to the second side 34 of the base (6, 6', 6", 6"', 6""). The spacer 140 preferably comprises a polymer based material 142 defined at opposite ends of the material 142 with a first material end 144 and opposite second material end 146. A threaded bore hole 152 extends into the material from the first material end 144. A threaded fitting 149 extends from the second material end 146. The threaded bore hole 152 aligns with at least one through-hole 24 such that the mounting hardware 81 is inserted through the through-hole 24 and into the bore 152 to removably fix the base (6, 6', 6", 6"', 6"") and spacer together. The threaded fitting 149 extends to at least one flange 120. The threaded fitting 149 aligns with a flange through-hole 127 and extend through the flange through-hole 127. At least one spacer 129 is employed per fixture (2, 2', 2", 2"') in the described manner. Thus, the display holder (8, 8', 8", 8"', 8"", 8""'), the base (6, 6', 6", 6"', 6""), the at least one spacer 140, and the flange 120 are in a layered arrangement. A washer 150 and a nut 112 are placed on the threaded fitting 149, wherein the flange 120 is between the material 142 and the washer 150/nut 112 combination, in order to mount the all the respective layers to a fixture or vehicle surface 26 (reference FIG. 7) of a vehicle or structure.

Figure 20A:
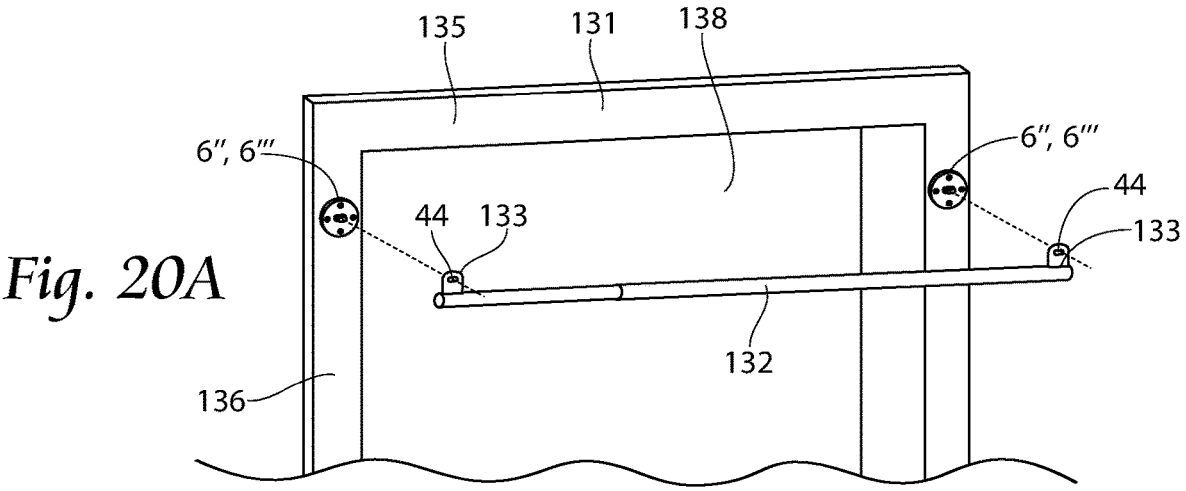
FIG. 20A is a perspective view of two fourth embodiments of the base opposite one another on the outer members of the casing of a doorframe, and joined by a cross bar.
Figure 20B:
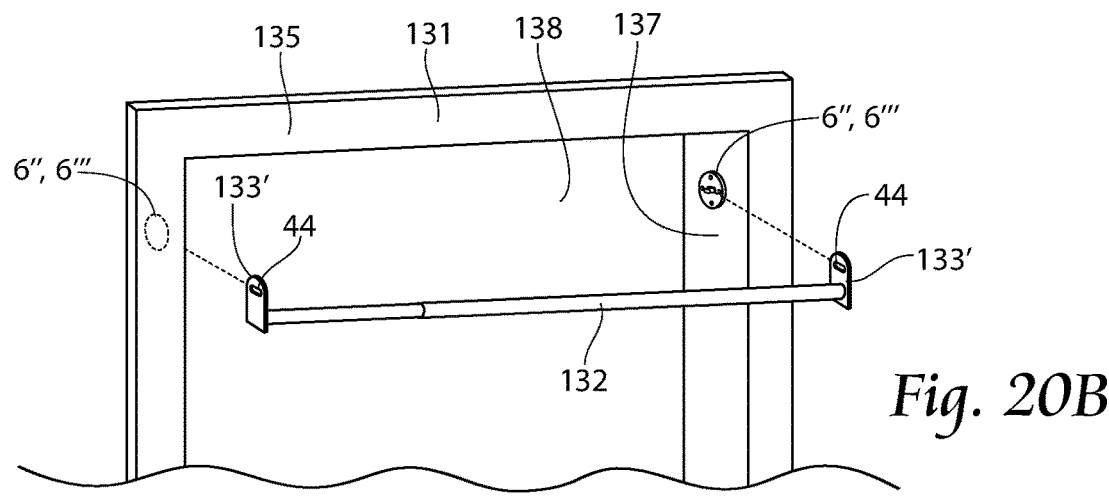
FIG. 20B is a perspective view of two fourth embodiments of the base opposite one another on the inner, opposed members of the casing of a doorframe, and joined by a cross bar.

With attention to FIGS. 20A and 20B, two bases (6", 6"') are positioned opposite one another on the casing 135 of a door frame 131 opposite and joined by a cross bar 132 is illustrated. As illustrated in FIG. 20A, the bases (6", 6"') may be on opposite sides of the casing 135 on outer members 136 which are not facing one another. The bar 132 contains a first embodiment of a connection tab at either end of the bar 132. Each tab 133 contains a through-hole 44. The bases (6", 6"') and through-holes 44 interact as previously described to removably attach the bar 132 to the casing 135. As illustrated in FIG. 20B, the base (6", 6"') may be facing one another on opposite inner members 137 within the opening of the doorway 138. In FIG. 20³, the bar 132 contains a second embodiment of the tab 133' at each end of the bar 132. Each tab comprises a through-hole 44, which interacts with the base (6", 6"') as previously described to hang the bar 132 to the casing 135.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:
1. A display assembly for attachment to a surface, said display assembly comprising:
    a display holder with at least one closed edge;
    a base, said base having at least one rotatable fastener opening and one mounting opening;
    at least one rotatable fastener, said fastener comprising an axle having a longitudinal axis, a knob formed at a first end of said axle and a cam formed at an opposite end of said axle;
    said cam having an outer cylindrical surface and at least one indentation formed in said outer cylindrical surface;
    said fastener opening including a cylindrical cam wall formed thereabout;

said cylindrical cam wall having at least one wall opening and a detent snap formed in said cylindrical cam wall opening;
a pair of bearings, each having an inner bearing surface;
said respective inner bearing surfaces of said bearings arranged to encompass said axle about said longitudinal axis; and
said display holder releasably positioned between said base and said knob;
whereby said cam and said axle are positioned within said fastener opening and said indentation formed in said outer cylindrical surface is arranged to selectively engage with said detent soap when said fastener is rotated about said longitudinal axis.

2. The display assembly for removable attachment to a surface of claim 1 further comprising:
said base having two rotatable fastener openings.

3. The display assembly for removable attachment to a surface of claim 2 further comprising:
a stability structure being formed on said base;
said stability structure located between said first and second fastener openings; and
said stability structure applying pressure to said display holder when said display holder is retained by said rotatable fasteners to said base.

4. The display assembly for removable attachment to a surface of claim 1 further comprising:
said base having two mounting openings.

5. The display assembly for removable attachment to a surface of claim 1 further comprising:
said fastener opening further including an elongated opening, each of said bearings being positioned in said elongated opening on opposite sides of said axle.

6. The display assembly for removable attachment to a surface of claim 1 further comprising:
said fastener opening further including a knob openings; and
said knob opening being smaller than said knob;
whereby said fastener is retained in said fastener opening after said knob is passed through said knob opening.

7. The display assembly for removable attachment to a surface of claim 6 further comprising:
said base having a first side; and
a raised lip formed on said first side of said base about said knob opening;
whereby said knob is retained on said base first side.

8. The display assembly for removable attachment to a surface of claim 1 further comprising:
said base having a first side; and
a raised lip formed on said first side of said base about said rotatable fastener opening.

9. The display assembly for removable attachment to a surface of claim 1 further comprising:
said base being rectangular in shape.

10. The display assembly for removable attachment to a surface of claim 1 further comprising:
said base being round in shape.

11. The display assembly for removable attachment to a surface of claim 1 further comprising:
said base being oval in shape.

12. A display holder base assembly for attachment to a surface, said display holder base assembly comprising:
a base, said base having at least one rotatable fastener opening and one mounting opening;
at least one rotatable fastener, said fastener comprising an axle having a longitudinal axis, a knob formed at a first end of said axle and a cam formed at an opposite end of said axle;
said cam having an outer cylindrical surface and at least one indentation formed in said outer cylindrical surface;
said fastener opening including a cylindrical cam wall formed thereabout;
said cylindrical cam wall having at least one wall opening and a detent snap formed in said cylindrical cam wall opening;
a pair of bearings, each having an inner bearing surface; and
said respective inner bearing surfaces of said bearings arranged to encompass said axle about said longitudinal axis;
whereby said cam and said axle are positioned within said fastener opening and said indentation formed in said outer cylindrical surface is arranged to selectively engage with said detent snap when said fastener is rotated about said longitudinal axis.

13. The display assembly for removable attachment to a surface of claim 12 further comprising:
said base having two rotatable fastener openings.

14. The display assembly for removable attachment to a surface of claim 12 further comprising:
said base having two mounting openings.

15. The display assembly for removable attachment to a surface of claim 12 further comprising:
said fastener opening further including an elongated opening, each of said bearings being positioned in said elongated opening on opposite sides of said axle.

16. The display assembly for removable attachment to a surface of claim 12 further comprising:
said fastener opening further including a knob opening; and
said knob opening being smaller than said knob;
whereby said fastener is retained in said fastener opening after said knob is passed through said knob opening.

17. The display assembly for removable attachment to a surface of claim 16 further comprising:
said base having a first side; and
a raised lip formed on said first side of said base about said knob opening;
whereby said knob is retained on said base first side.

18. The display assembly for removable attachment to a surface of claim 12 further comprising:
said base having a first side; and
a raised lip formed on said first side of said base about said rotatable fastener opening.

19. The display assembly for removable attachment to a surface of claim 12 further comprising:
said base being rectangular in shape.

20. The display assembly for removable attachment to a surface of claim 12 further comprising:
said base being round in shape.

21. The display assembly for removable attachment to a surface of claim 12 further comprising:
said base being oval in shape.

* * * * *

UNITED STATES PATENT AND TRADEMARK OFFICE
CERTIFICATE OF CORRECTION

PATENT NO. : 12,180,985 B2  
APPLICATION NO. : 17/569756  
DATED : December 31, 2024  
INVENTOR(S) : M Randall Pasternak and Mark Donald Schaefer Page 1 of 1

It is certified that error appears in the above-identified patent and that said Letters Patent is hereby corrected as shown below:

In the Claims

Claim 1, Column 17, Line 13: delete "soap" and substitute --- snap ---

Signed and Sealed this  
Twenty-third Day of September, 2025

John A. Squires  
*Director of the United States Patent and Trademark Office*